United States Patent
Kelly et al.

(10) Patent No.: US 12,094,288 B2
(45) Date of Patent: Sep. 17, 2024

(54) SYSTEM AND METHOD FOR SYNTHETIC IMAGE TRAINING OF A MACHINE LEARNING MODEL ASSOCIATED WITH A CASINO TABLE GAME MONITORING SYSTEM

(71) Applicant: LNW Gaming, Inc., Las Vegas, NV (US)

(72) Inventors: Bryan M. Kelly, Rancho Santa Margarita, CA (US); Terrin Eager, Campbell, CA (US); Martin S. Lyons, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

(21) Appl. No.: 18/491,257

(22) Filed: Oct. 20, 2023

(65) Prior Publication Data
US 2024/0046739 A1 Feb. 8, 2024

Related U.S. Application Data

(63) Continuation of application No. 17/514,062, filed on Oct. 29, 2021, now Pat. No. 11,798,353, which is a continuation of application No. 16/884,539, filed on May 27, 2020, now Pat. No. 11,205,319.

(60) Provisional application No. 62/864,634, filed on Jun. 21, 2019.

(51) Int. Cl.
*G07F 17/32* (2006.01)
*G06N 3/08* (2023.01)

(52) U.S. Cl.
CPC .............. *G07F 17/322* (2013.01); *G06N 3/08* (2013.01); *G07F 17/3223* (2013.01)

(58) Field of Classification Search
CPC ..... G07F 17/322; G07F 17/3223; G06N 3/08; G06N 3/006; G06N 3/088
USPC .......................................................... 463/25
See application file for complete search history.

(56) References Cited

U.S. PATENT DOCUMENTS

| | | | |
|---|---|---|---|
| 5,103,081 | A | 4/1992 | Fisher et al. |
| 5,451,054 | A | 9/1995 | Orenstein |
| 5,722,893 | A | 3/1998 | Hill et al. |
| 5,757,876 | A | 5/1998 | Dam et al. |
| 6,039,650 | A | 3/2000 | Hill |
| 6,299,536 | B1 | 10/2001 | Hill |
| 6,460,848 | B1 | 10/2002 | Soltys et al. |
| 6,514,140 | B1 | 2/2003 | Storch |
| 6,517,435 | B2 | 2/2003 | Soltys et al. |
| 6,517,436 | B2 | 2/2003 | Soltys et al. |
| 6,520,857 | B2 | 2/2003 | Soltys et al. |
| 6,527,271 | B2 | 3/2003 | Soltys et al. |
| 6,530,836 | B2 | 3/2003 | Soltys et al. |
| 6,530,837 | B2 | 3/2003 | Soltys et al. |
| 6,533,276 | B2 | 3/2003 | Soltys et al. |

(Continued)

OTHER PUBLICATIONS

US 10,854,041 B2, 12/2020, Shigeta (withdrawn)

*Primary Examiner* — Pierre E Elisca

(57) ABSTRACT

Disclosed are a system and method for training a neural network associated with a casino table game monitoring system. Synthetic images of objects extracted from a virtual table game environment are used to train a machine learning model, which is deployed to a casino table game monitoring system to monitor one or more physical objects relative to a physical gaming table in a physical table game environment.

15 Claims, 12 Drawing Sheets

(56) References Cited

U.S. PATENT DOCUMENTS

| | | |
|---|---|---|
| 6,533,662 B2 | 3/2003 | Soltys et al. |
| 6,579,180 B2 | 6/2003 | Soltys et al. |
| 6,579,181 B2 | 6/2003 | Soltys et al. |
| 6,582,301 B2 | 6/2003 | Hill |
| 6,595,857 B2 | 7/2003 | Soltys et al. |
| 6,663,490 B2 | 12/2003 | Soltys et al. |
| 6,688,979 B2 | 2/2004 | Soltys et al. |
| 6,712,696 B2 | 3/2004 | Soltys et al. |
| 6,758,751 B2 | 7/2004 | Soltys et al. |
| 6,871,194 B1 | 3/2005 | Cardno |
| 7,011,309 B2 | 3/2006 | Soltys et al. |
| 7,124,947 B2 | 10/2006 | Storch |
| 7,316,615 B2 | 1/2008 | Soltys et al. |
| 7,753,781 B2 | 7/2010 | Storch |
| 7,771,272 B2 | 8/2010 | Soltys et al. |
| 8,116,787 B1 | 2/2012 | Lektuai |
| 8,130,097 B2 | 3/2012 | Knust et al. |
| 8,285,034 B2 | 10/2012 | Rajaraman et al. |
| 8,606,002 B2 | 12/2013 | Rajaraman et al. |
| 8,896,444 B1 | 11/2014 | Knust et al. |
| 9,165,420 B1 | 10/2015 | Knust et al. |
| 9,174,114 B1 | 11/2015 | Knust et al. |
| 9,378,605 B2 | 6/2016 | Koyama |
| 9,415,307 B2 | 8/2016 | Kelly et al. |
| 9,511,275 B1 | 12/2016 | Knust et al. |
| 9,795,870 B2 | 10/2017 | Ratliff |
| 9,842,585 B2 | 12/2017 | Huang et al. |
| 9,889,371 B1 | 2/2018 | Knust et al. |
| 10,032,335 B2 | 7/2018 | Shigeta |
| 10,089,178 B2 | 10/2018 | Iljazi |
| 10,096,206 B2 | 10/2018 | Bulzacki et al. |
| 10,112,113 B2 | 10/2018 | Krishnamurthy |
| 10,134,223 B2 | 11/2018 | Mandava et al. |
| 10,192,085 B2 | 1/2019 | Shigeta |
| 10,213,692 B2 | 2/2019 | Velic et al. |
| 10,242,525 B1 | 3/2019 | Knust et al. |
| 10,242,527 B2 | 3/2019 | Bulzacki et al. |
| 10,262,236 B2 | 4/2019 | Lim et al. |
| 10,296,794 B2 | 5/2019 | Ratti |
| 10,380,838 B2 | 8/2019 | Bulzacki et al. |
| 10,398,202 B2 | 9/2019 | Shigeta |
| 10,403,090 B2 | 9/2019 | Shigeta |
| 10,410,066 B2 | 9/2019 | Bulzacki et al. |
| 10,493,357 B2 | 12/2019 | Shigeta |
| 10,529,183 B2 | 1/2020 | Shigeta |
| 10,535,174 B1 | 1/2020 | Rigiroli et al. |
| 10,540,846 B2 | 1/2020 | Shigeta |
| 10,580,254 B2 | 3/2020 | Shigeta |
| 10,593,154 B2 | 3/2020 | Shigeta |
| 10,600,279 B2 | 3/2020 | Shigeta |
| 10,600,282 B2 | 3/2020 | Shigeta |
| 10,665,054 B2 | 5/2020 | Shigeta |
| 10,706,675 B2 | 7/2020 | Shigeta |
| 10,720,013 B2 | 7/2020 | Main, Jr. |
| 10,741,019 B2 | 8/2020 | Shigeta |
| 10,748,378 B2 | 8/2020 | Shigeta |
| 10,755,524 B2 | 8/2020 | Shigeta |
| 10,755,525 B2 | 8/2020 | Shigeta |
| 10,762,745 B2 | 9/2020 | Shigeta |
| 10,846,985 B2 | 9/2020 | Shigeta |
| 10,825,288 B1 | 11/2020 | Knust et al. |
| 10,832,517 B2 | 11/2020 | Bulzacki et al. |
| 10,846,980 B2 | 11/2020 | French et al. |
| 10,846,986 B2 | 11/2020 | Shigeta |
| 10,846,987 B2 | 11/2020 | Shigeta |
| 2005/0059479 A1 | 3/2005 | Soltys et al. |
| 2006/0019739 A1 | 1/2006 | Soltys et al. |
| 2008/0300055 A1* | 12/2008 | Lutnick .............. G07F 17/3209 463/39 |
| 2011/0195788 A1* | 8/2011 | Wells .................. G07F 17/323 463/47 |
| 2012/0058816 A1* | 3/2012 | Wells .................. A63F 11/00 463/25 |
| 2013/0130790 A1* | 5/2013 | Wells .................. G07F 17/32 463/29 |
| 2013/0217491 A1* | 8/2013 | Hilbert .............. A63F 13/00 463/31 |
| 2014/0257805 A1 | 9/2014 | Huang et al. |
| 2016/0328913 A1* | 11/2016 | Blazevic ............ G07F 17/3211 |
| 2017/0249551 A1 | 8/2017 | Iljazi |
| 2017/0282063 A1 | 10/2017 | Krishnamurthy |
| 2017/0304732 A1 | 10/2017 | Velic et al. |
| 2018/0018014 A1* | 1/2018 | Lutnick .............. G06V 40/107 |
| 2018/0053377 A1 | 2/2018 | Shigeta |
| 2018/0061178 A1 | 3/2018 | Shigeta |
| 2018/0068525 A1 | 3/2018 | Shigeta |
| 2018/0075698 A1 | 3/2018 | Shigeta |
| 2018/0114406 A1 | 4/2018 | Shigeta |
| 2018/0157974 A1 | 6/2018 | Carr et al. |
| 2018/0211110 A1 | 7/2018 | Shigeta |
| 2018/0211117 A1 | 7/2018 | Ratti |
| 2018/0211472 A1 | 7/2018 | Shigeta |
| 2018/0232987 A1 | 8/2018 | Shigeta |
| 2018/0239984 A1 | 8/2018 | Shigeta |
| 2018/0293756 A1 | 10/2018 | Liu et al. |
| 2018/0307561 A1 | 10/2018 | Iljazi |
| 2018/0314963 A1 | 11/2018 | Kovcs |
| 2018/0336757 A1 | 11/2018 | Shigeta |
| 2018/0359040 A1 | 12/2018 | Lee et al. |
| 2018/0359041 A1 | 12/2018 | Lee et al. |
| 2019/0043309 A1 | 2/2019 | Shigeta |
| 2019/0060759 A1 | 2/2019 | Krishnamurthy |
| 2019/0060760 A1 | 2/2019 | Krishnamurthy |
| 2019/0088082 A1 | 3/2019 | Shigeta |
| 2019/0102987 A1 | 4/2019 | Shigeta |
| 2019/0147689 A1 | 5/2019 | Shigeta |
| 2019/0172312 A1 | 6/2019 | Shigeta |
| 2019/0188957 A1 | 6/2019 | Bulzacki et al. |
| 2019/0188958 A1 | 6/2019 | Shigeta |
| 2019/0197402 A1 | 6/2019 | Kovcs et al. |
| 2019/0236891 A1 | 8/2019 | Shigeta |
| 2019/0259238 A1 | 8/2019 | Shigeta |
| 2019/0266489 A1 | 8/2019 | Hu et al. |
| 2019/0266832 A1 | 8/2019 | Shigeta |
| 2019/0318576 A1 | 10/2019 | Shigeta |
| 2019/0320768 A1 | 10/2019 | Shigeta |
| 2019/0333322 A1 | 10/2019 | Shigeta |
| 2019/0333323 A1 | 10/2019 | Shigeta |
| 2019/0333326 A1 | 10/2019 | Shigeta |
| 2019/0340469 A1 | 11/2019 | Su et al. |
| 2019/0340873 A1 | 11/2019 | Shigeta |
| 2019/0344157 A1 | 11/2019 | Shigeta |
| 2019/0347893 A1 | 11/2019 | Shigeta |
| 2019/0347894 A1 | 11/2019 | Shigeta |
| 2019/0354759 A1 | 11/2019 | Somers et al. |
| 2019/0362594 A1 | 11/2019 | Shigeta |
| 2019/0371112 A1 | 12/2019 | Shigeta |
| 2020/0033938 A1* | 1/2020 | Lutnick .............. G07F 17/32 |
| 2020/0034629 A1 | 1/2020 | Vo et al. |
| 2020/0035060 A1 | 1/2020 | Shigeta |
| 2020/0073968 A1 | 3/2020 | Zhang et al. |
| 2020/0118390 A1 | 4/2020 | Shigeta |
| 2020/0122018 A1 | 4/2020 | Shigeta |
| 2020/0122039 A1 | 4/2020 | Meuleau et al. |
| 2020/0129862 A1 | 4/2020 | Liu et al. |
| 2020/0143197 A1 | 5/2020 | Zmijewski et al. |
| 2020/0160168 A1 | 5/2020 | Yang et al. |
| 2020/0175806 A1 | 6/2020 | Shigeta |
| 2020/0202134 A1 | 6/2020 | Bulzacki et al. |
| 2020/0226878 A1 | 7/2020 | Shigeta |
| 2020/0234464 A1 | 7/2020 | Shigeta |
| 2020/0242888 A1 | 7/2020 | Shigeta |
| 2020/0258351 A1 | 8/2020 | Shigeta |
| 2020/0265672 A1 | 8/2020 | Shigeta |
| 2020/0273289 A1 | 8/2020 | Shigeta |
| 2020/0294346 A1 | 9/2020 | Shigeta |
| 2020/0302169 A1 | 9/2020 | Vo et al. |
| 2020/0342281 A1 | 10/2020 | Shigeta |
| 2020/0349806 A1 | 11/2020 | Shigeta |
| 2020/0349807 A1 | 11/2020 | Shigeta |
| 2020/0349808 A1 | 11/2020 | Shigeta |
| 2020/0349809 A1 | 11/2020 | Shigeta |
| 2020/0349810 A1 | 11/2020 | Shigeta |
| 2020/0349811 A1 | 11/2020 | Shigeta |

(56) References Cited

U.S. PATENT DOCUMENTS

| | | |
|---|---|---|
| 2020/0364979 A1 | 11/2020 | Shigeta |
| 2020/0372746 A1 | 11/2020 | Shigeta |
| 2020/0372752 A1 | 11/2020 | Shigeta |

* cited by examiner

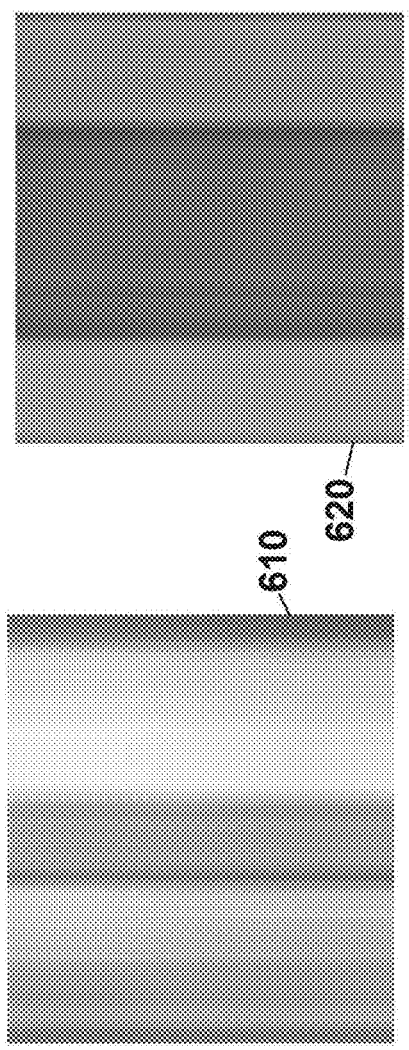
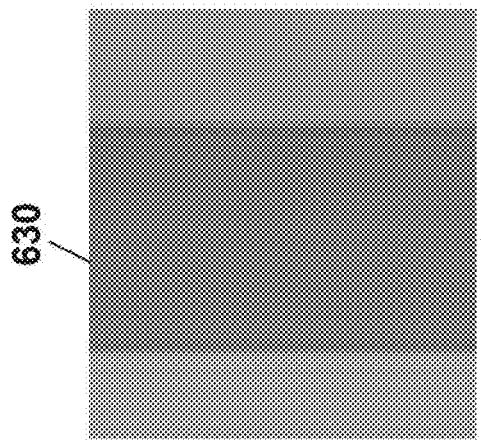
FIG. 6A
FIG. 6B
FIG. 6C

SYSTEM AND METHOD FOR SYNTHETIC IMAGE TRAINING OF A MACHINE LEARNING MODEL ASSOCIATED WITH A CASINO TABLE GAME MONITORING SYSTEM

RELATED APPLICATIONS

This patent application is a continuation of, and claims priority benefit of, U.S. patent application Ser. No. 17/514,062 filed Oct. 29, 2021, which is a continuation of and claims priority benefit of U.S. patent application Ser. No. 16/884,539 filed May 27, 2020, which claims the priority benefit of U.S. Provisional Patent Application Ser. No. 62/864,634, filed Jun. 21, 2019. The contents of the Ser. No. 17/514,062 application, the Ser. No. 16/884,539 application and the 62/864,634 application are each incorporated herein by reference in their respective entireties.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD OF THE INVENTION

Embodiments of the inventive subject matter relate generally to wagering game systems, and more particularly to monitoring various aspects of casinos and gaming, and more specifically relates to automated game and wager tracking and analysis via a neural network trained to monitor a casino table game through the use of synthetically-generated images.

BACKGROUND OF THE INVENTION

Casinos and other forms of gaming are a multi-billion dollar, world-wide industry. Typically, a customer exchanges currency or some form of credit for a casino's chips. The customer places the chips as wagers at various games, such as blackjack, craps, roulette, and baccarat. A game operator, such as a dealer, pays out winning wagers with additional chips based on the set of odds for the particular game. The dealer collects the customer's chips for losing wagers. The odds of each game slightly favor the casino, so on average the casino wins and is profitable.

Like many businesses, casinos wish to understand the habits of their customers. Some casinos have employees visually observe customer's game play, manually tracking the gaming and wagering habits of the particular customers. The information allows the casinos to select the number of different games that the casino will provide and to adequately staff those games. The information also allows the casinos to select certain customers to receive complimentary benefits ("comps") and to determine the amount of comps a particular customer is to receive. The act of giving comps to a customer, commonly referred to as "comping," produces a large amount of good will with the customers, encouraging customer loyalty and further wagering. Some casinos have attempted to partially automate the tracking process, reading a customer "comp" card to identify the customer. The actual gaming and wagering patterns of the customers are visually observed by casino personnel and manually entered into a computer to create a digitized copy of the customer's gaming habits.

Similarly, casinos wish to track the efficiency of the casino and the casino's employees. Such information allows the casino to make change to increase the overall efficiency of the casino and of the employees, benefiting both the casino and customers. A typical method of tracking employee efficiency is to manually count the number of hands of blackjack dealt by a dealer over some time period. A change in an amount in a bank at the gaming table can also be manually determined and combined with the count of the number of hands to determine a won/loss percentage for the dealer. The casino can use the information to take appropriate action, such as rewarding an efficient dealer, or providing additional training to an inefficient dealer.

The fast pace and large sums of money make casinos likely targets for cheating and stealing. Casinos employ a variety of security measures to discourage cheating or stealing by both customers and employees. For example, surveillance cameras covering a gaming area or particular gaming table provide a live or taped video signal that security personnel can closely examine. Additionally, or alternatively, "pit managers" can visually monitor the live play of a game at the gaming table.

While some aspects of a casino's security system should be plainly visible as a deterrent, other aspects of the security should be unobtrusive to avoid detracting from the players' enjoyment of the game and to prevent cheaters and thieves from avoiding detection.

The previous methods of tracking have several drawbacks. The methods typically depend on manual observation of a gaming table. Thus coverage is not comprehensive, and is limited to tracking a relatively small number of games, customers and employees. This problem is exacerbated by a customer's ability to rapidly move between gaming tables. A commonly known method for cheating customers to avoid detection is to switch tables frequently. The tracking methods are also prone to error since the manual methods rely on human observers who can become inattentive or distracted. In one commonly known method of cheating the casino, one member of a team will create a distraction while another member steals chips or swaps cards. These manual tracking methods are also labor intensive, and thus costly.

Automated systems that automatically image the activity or events occurring at a gaming table periodically compare images of the gaming table to identify wagering, as well as the appearance, removal and position of cards and/or other objects on the gaming table. Such a table monitoring system can utilize cameras unobtrusively located, for example, in the chip tray, around the edges of the table or in the vicinity of the table, such as in signage related to the table game. The system can monitor the gaming habits of players and the performance of employees and can detect suspect playing and wagering patterns that may be prohibited. The system can also identify the win/loss percentage of the players and the dealer, as well as a number of other statistically relevant measures. Such measures can provide a casino or other gaming establishment with enhanced automated security, and automated real-time accounting. The measures can additionally provide a basis for automatically allocating complimentary benefits to the players.

Casino table game chip detection and chip value classification using cameras combined with neural networks is a new way to leverage computer vision to make highly accurate determination of each chip/stack value bet by a player on a live dealer casino table game. These chip readings are used to determine the total value wagered by each person at each seat position and to determine which side bets were made. This information is used to help assure proper patron comping and for other reasons at a table game. Computer vision combined with deep-learning has the advantage of limiting the amount of software needed to be written by a programmer to identify the objects the camera is looking at. Computer vision can effectively mimic a human's ability to detect and classify any object including chips, cash, coins, cards, a person and any other object that may be on or around the casino table.

To realize the advantage of deep learning, typically, many thousands of images of each chip denomination (ex. $1, $5, $25, $100, $500) must be photographed and properly labeled manually. These photographs should be taken in all lighting conditions and using many different background felts for the table. The more images taken of chips in various stack configurations, room lighting conditions, and at various locations around the table, the better the deep-learning software will be trained to recognize and classify each particular chip during actual game play. This collection of data for neural network training is very time consuming to achieve by humans.

Another problem is that live testing of the trained neural network at deployment time in a real casino is also very labor intensive and time consuming. Once deployed in the real world, the vision software that detects stacks of chips and identifies their locations on the table must be tested to assure it accurately finds objects like a stack of chips on a highly cluttered table with printed words, graphic art, human hands, drinks, cigars, and ashtrays and the like. This is a non-trivial task. Thousands of different chip stack configurations must be hand-placed on a representative physical gaming table and tested to ensure that the computer vision software is capable of detecting and extracting all placed stacks of chips from the "noisy" felt background of a gaming table so an image of each chip can be sent to the trained neural network for classification. Then it must be confirmed that no chips have been misclassified because the real-life chip/stack images are too different from those used to train the neural network off-site. As in the initial training phase, a large number of live camera images of each chip denomination must be captured. Each chip in each image must be detected and classified, then compared against its known value, called its "ground truth," to ensure that the system is accurate in its intended operating environment.

Thus, an improved method of training a neural network that speeds up the training process, automates testing and improves the accuracy of the neural network, is desirable.

SUMMARY OF THE INVENTION

Objects and advantages of the invention will be set forth in part in the following description, or may be obvious from the description, or may be learned through practice of the invention.

In one embodiment, a method and/or system is disclosed for obtaining information from a casino (e.g., specification data) related to a physical object positioned relative to a physical gaming table and generating, based on the specification data, synthetic image data. The method and/or system can further train a machine learning model using the synthetic image data, and deploy the trained machine learning model to a casino table game monitoring system to monitor the physical object relative to the physical gaming table. In one embodiment, the synthetic image data is generated via analysis of images captured of a virtual object depicted in a virtual scene relative to a virtual gaming table. The virtual object is modeled using the specification data. The virtual gaming table is modeled according to known dimensions of the physical gaming table. Furthermore, in one aspect, the invention includes a system for automatically simulating some or all aspects of virtual table game play with virtual chips, virtual felt layouts and virtual room lighting to simulate millions of virtual games being played, finding specific gaming objects using one or more virtual cameras combined with computer vision software, and using those images to train and test a neural network which, once trained and tested, may classify/identify each gaming object.

In accordance with another aspect, a system can test the computer vision gaming object detection software in an automated fashion.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

FIGS. 6A-6C illustrate various modified and standardized slice images of a virtual casino chip taken at different camera angles in accordance with one or more embodiments;

DETAILED DESCRIPTION

Figure 1:
FIG. 1 illustrates examples of synthetically created/modeled casino chips in accordance with one or more embodiments.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Certain aspects of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

For purposes of the present detailed description, the singular includes the plural and vice versa (unless specifically disclaimed); the word "all" means "any and all"; the word "any" means "any and all"; and the word "including" means "including without limitation."

As described above, the use of neural networks in monitoring table games has been hampered by the large amount of real world data that must be captured and identified in order to properly train and test the neural networks. A better approach is to use synthetic images taken from a virtual table game environment and create thousands of labeled pictures and associated data files automatically. As long as these images look nearly the same as taken by real world camera on a real table, they can be used to train a single shot detector (SSD) or you-only-look-once (YOLO) neural network more efficiently than previous methods. See, for example: https://technostacks.com/blog/yolo-vs-ssd/.

Thus, a goal of the embodiments of the present invention is to train a neural network to be flexible and adaptive to the massive amount of environment changes that occur on a real world gaming table by simulating the gaming table in a virtual world and capturing images of the virtual gaming table for use in automatically training the neural networks using images from the virtual world. When the neural networks are deemed accurate enough, they may then be deployed in real casino table game environments. Thus, a game simulation engine employing a computer vision software package may be used to "teach" one or more neural networks to accurately detect and classify every object and event happening on a casino table game.

While the non-limiting examples below describe one or more embodiments directed to the identification of various denominations of casino chips, the virtual game simulation and neural network training process described herein can be performed for virtual player cards, virtual people, virtual cash, virtual casino chips, virtual drinks and their fill levels, virtual cigarettes/cigars or any other object that can be on or about the virtual table game surface.

In accordance with one or more embodiments, a neural network is trained to recognize the denominations of casino chips visible in an image of a casino gaming table. To achieve the initial model of a neural network that can be used to monitor various aspects of a live casino table game, a 3D rendering/animation programmable software package like Unity3D may be used to simulate a casino table game in a virtual environment. Unity3D is a tool that game developers often use to build 3D games for deployment on various game platforms like game consoles, personal computers, mobile phones, etc.

In accordance with one or more embodiments, casinos may provide images/design specs of their table chips for neural network training. Based on these specifications, virtual chips are created using a 3D modeling program, a non-limiting example of which is 3DS by Autodesk. In some embodiments, the casinos may provide physical chips to assist in the modeling. Once completed, the 3D mesh/texture models representing the chips are imported into Unity3D. When displayed, these virtual chips look identical to the real chips in all aspects, for example, size, color, banding, labeling, etc. FIG. 1 illustrates examples of synthetically created/modeled casino chips capable of being imported into the Unity3D game environment in accordance with one or more embodiments.

Similarly, casinos provide may electronic designs or physical copies of the table felts used on the gaming tables at the casino. Electronic images of the felts are then typically stored in a 2D "Photo Shop" file format. These images of the felt include accurate representations of the felt material, including, for example, colors, casino branding, game branding, game rules, bet zones and the like. These images are converted into a 2D mesh texture that is imported into also Unity3D and overlaid on a virtual table 3D model. When complete, the simulated table in Unity3D looks just like a 1-to-1 scale model of a real world casino gaming table. Typically all felt images are converted to a white background color, so the Unity3D program can dynamically change the color of the felt to thousands of different colors in an automated fashion. The goal is to normalize out the felt colors as it relates to chip detection and chip/stack classification. They more types/colors of felts used to train the neural network, the more flexible and accurate the network will be as it is deployed on real tables of varying felt colors. Different colored felts reflect room lighting differently and cast their colors onto the edges of the chips, which changes the natural colors of the chips. Thus, changing the color of the felts and how and where the chips located or stacked is an important element in capturing images used for neural network training.

Figure 2:
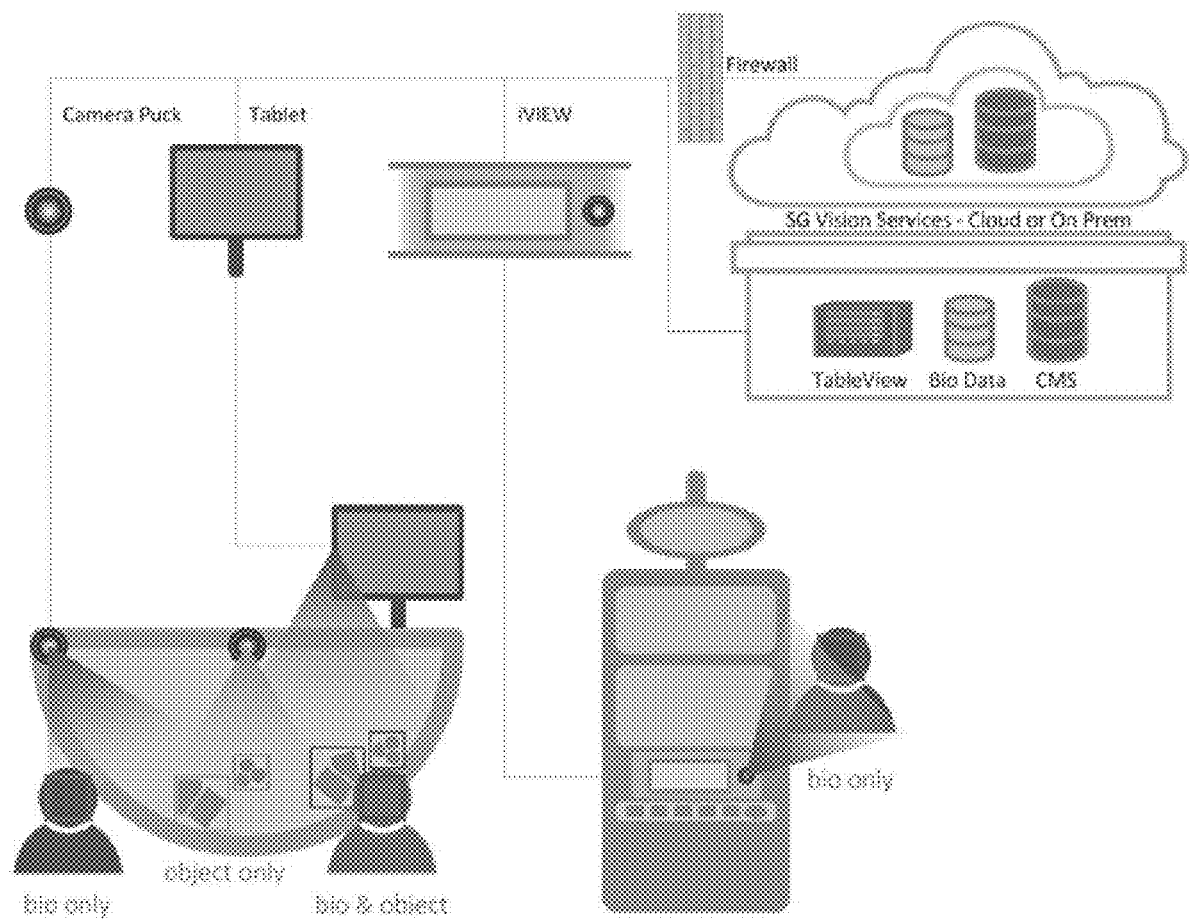
FIG. 2 is a block diagram of a system in accordance with aspects of the present invention.

FIG. 2, in accordance with one or more embodiments, illustrates a high level architecture of casino table games, slot machines, and resort cameras that implement biometrics and object detection like chips, cards, currency, drinks, cigars, retail items, player cards through the use of cameras. Similarly, the virtual table game includes virtual cameras placed around it in locations that mimic the locations at which real cameras are placed on the actual tables in a casino. For example, two cameras may be placed, one to the left and one to the right of the dealer. The Unity 3D virtual cameras ideally mimic the real camera specifications, for example the focal length, the CCD sensor size in millimeters, HDR capability, light sensitivity, etc., are matched to their real world counterparts. The virtual cameras may also be "depth sensing" or "stereoscopic cameras". They may also have unique exposure, brightness, saturation, contrast, HDR, raw or compressed image settings, frames per second settings, etc. The virtual cameras may periodically be rotated relative to the table surface. They may also have the ability to do region of interest that allows the camera to dynamically focus on a specific section of the image it sees so the virtual image is in focus for that region of interest. For example a specific pile of chips can be in focus and the rest of the scene can be more blurred. Many modern day cell phones and tablets have this feature to allow specific people or object to be most in focus. Unity3D has the ability to render photorealistic images that take all virtual lighting sources, virtual camera specifications and virtual materials/textures of all objects in a scene into account. The level of photorealism of a virtual table compared to a real "live" table is quite accurate, especially when additional Unity3D plug-ins like Octane Renderer by Otoy Inc. are used.

In accordance with one or more embodiments, virtual 3D players and dealer avatars can be included to simulate real humans playing and dealing the card game. These avatars may have faces that look like real human beings and dynamically changed/moved to simulate the real comings and goings of players in the casino. Synthetic face images like "Deep Fake" may be used to test the camera's biometric software's ability to recognize faces and assign virtual chip and bets and card play activity to particular players.

In accordance with one or more embodiments, a virtual table shoe containing playing cards is positioned on the table for optimal dealing of playing cards by the virtual dealer to each of the player stations. These shoes will store randomly ordered virtual player card decks just like the real table games on a casino floor. Also a virtual chip tray may be included in the scene. This is the tray that the dealer uses to cash-in players, to pay players and to receive players' chips on losing games. Additional virtual cameras may be placed in the scene such that they can view the quantity of the chips in each stack in the chip tray.

In accordance with one or more embodiments, virtual table signage or interactive displays may be placed on or around the Unity3D virtual table to mimic signage and information that is typically shown to players and dealers. In accordance with still other embodiments, the data/user experience presented on these screens in a real casino may leverage virtual computer vision originated data (chips, cards, players) to make the game a compelling table game experience.

During simulated table game play, virtual camera software detects each virtual card being "dealt" and triggers capture of a picture, pictures, or videos of the table bet zones. These bet zone pictures are passed to computer vision software for image pre-processing, detection of chip stacks and the extraction and saving of individual chip slices (described below) used for neural network training. The virtual environment software knows what chips it has placed on the table and where those chips were placed. Thus, the individual chip slices can be correlated to a chip value, providing a known "ground truth" for training of the neural network, as will be describe further below. (In machine learning, the term "ground truth" refers to the accuracy of the training set's classification for supervised learning techniques. This is used in statistical models to prove or disprove research hypotheses. The term "ground truthing" refers to the process of gathering the proper objective (provable) data for this test.)

Figure 3:
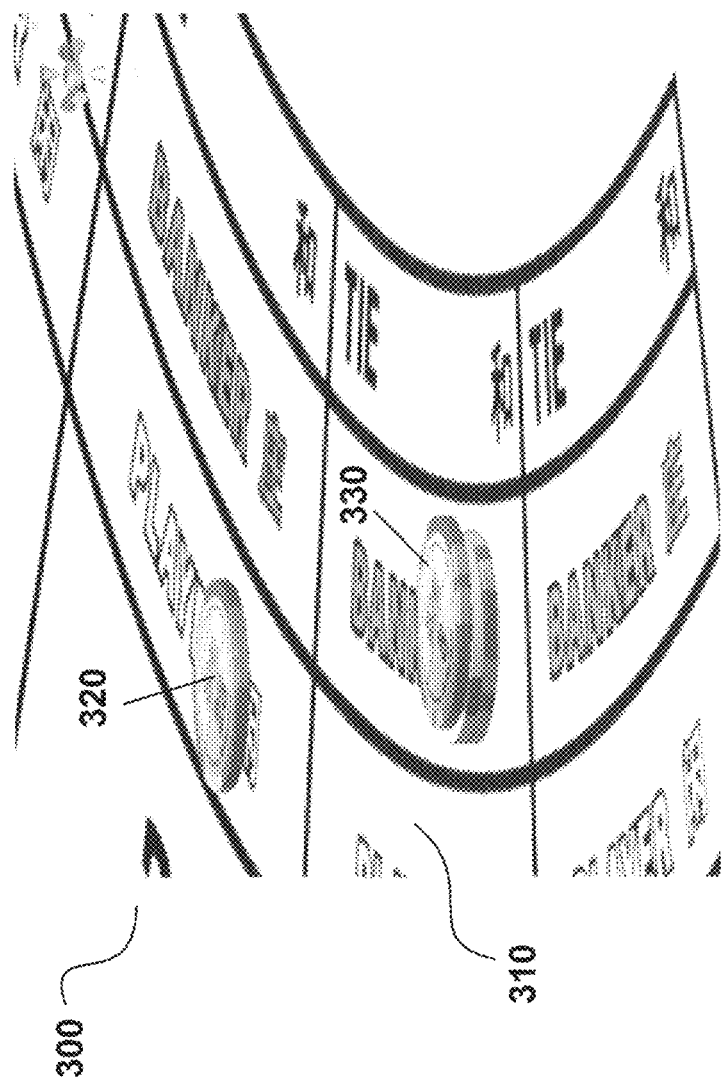
FIG. 3 illustrates an example view of a bet zone of a virtual baccarat table containing images of virtual chips in accordance with one or more embodiments.

FIG. 3, in accordance with one or more embodiments, represents a view 300 of a bet zone 310 of a virtual baccarat table. Bet zone 310 contains a single chip 320 and a chip stack 330. When placing chips in bet zone 310, for a given bet value, software in the simulation software randomly creates stacks of varying chip values, creating stacks of varying heights. The stacks are also non-vertically aligned, again in a random fashion, to simulate what real players do with real chips on a live table. In this baccarat game image, single chip 320 represents a single $25 chip in the player bet for station 3, and a $506 bet, in stack 330 constructed from 3 chips, in the banker bet for station number 2.

The computer vision software, for example, OPENCV (http://opencv.org/), performs various functions like reading the felt to determine the valid bet zones for each player, do Gaussian blur on the image, subtracting the previously stored background felt image, perform image thresholding, perform morphological close on the image, find contours in the image to find minimum bounding rectangles of stacks of chips on the playfield and crop them out of the image, determine if the stacks are in valid bet zones, do color image processing to balance/equalize the colors, adjust contrast and brightness of the chips stacks, and rotate the stacks, as needed, to correct for camera lens distortion. This stack detection computer vision processing prepares the chip stack images for further individual chip extraction. The virtual camera has a depth of field feature that ensures that images of chips/stacks taken farther from the fixed mount virtual camera appear more blurred than chips that are closer to the camera. This ensures that the virtual images of stacks would mimic images taken from real cameras taken from the actual live table in a casino, where more distant chips are also blurrier than close chips.

Various virtual light sources may be placed in the Unity3D scene. These light sources can be point, diffuse, directional, or area lights. They can create any set of random colors and brightness of emitted light onto the surface of the table and the surrounding areas. This is one of the key environment variables to be dynamically modified to create a broad assortment of reflections, colors, and shadows reflected on the virtual chips and felt. Casino lighting around the table games varies immensely from table to table and even on the same table game. There may be hotspots on one side of the table and dark spots on the other side of the table. The cameras may also be configured to randomly, or in a defined fashion, change the locations of their attention depending on what the system is tracking at a given moment. It is very important to create neural network training images in as many of these different lighting configurations as possible to ensure a robust and accurate neural network in real world deployments. The various synthetic lighting moods can be used to test the computer vision software's ability to find the chips/stacks on the virtual felt. Each 2D image that the virtual cameras see of the virtual playfield may be fed into OPENCV to test how well the computer vision software is tuned to find/detect chips/stacks on the table. The OPENCV image processing software may be the same software that is later executed on a live casino table.

The computer vision software is used to find the color bands of each slice. Typical functions to find the slices include, but are not limited to, image rotation to adjust for lens warp effect, converting the image to greyscale, Gaussian blurring the image, finding contours, edge detection and color filter processing. Together, these functions find the bounds/edges of each individual chip and then apply a crop/mask function to the original stack image to extract each slice from the stack.

In accordance with one or more embodiments, after good images of chip stacks are cropped out of the larger camera image, they are passed to a pre-processing logic module that performs further image processing to find the chip edge for each chip. For the purposes of this disclosure, this image of the chip edge will be referred to as a "slice". It should be noted that the same image preprocessing software is also used at runtime in real casinos. The goal here is to simulate and automatically test the image processing logic that will be used in the real world, ensuring the highest accuracy possible.

Figure 4:
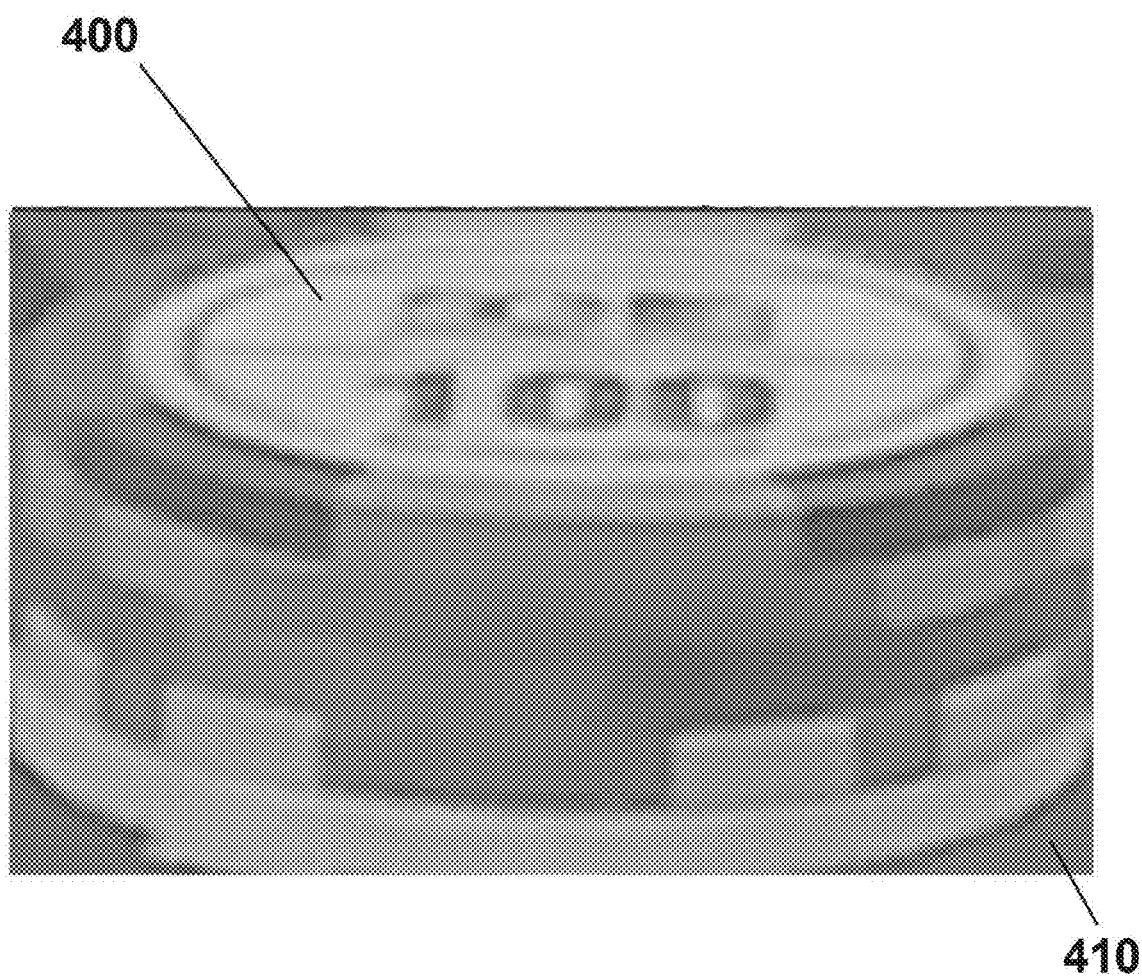
FIG. 4 illustrates a cropped virtual chip stack captured with a virtual depth of field camera in accordance with one or more embodiments.

FIG. 4, in accordance with one or more embodiments, illustrates a typical cropped chip stack 400 on the playfield, imaged as a virtual stack captured in the Unity3D game environment with a depth of field camera that caused the image to be blurred and pixelated similar to a real camera that would be mounted on a live table game. The felt 410 may have been virtually colored by Unity3D logic for this game, for example, it may be blue. On other simulated games, it may be a different felt color, as discussed above.

Figure 5A:
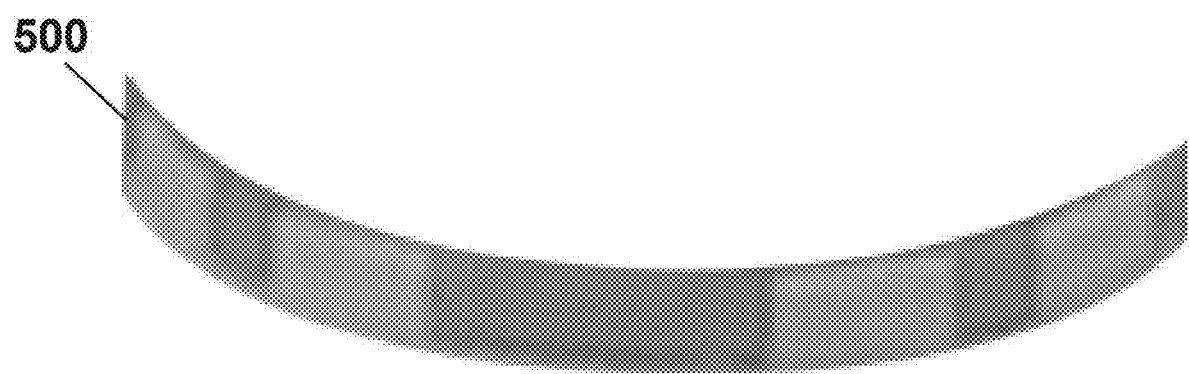
FIG. 5A illustrates a slice image of a chip isolated in a virtual stack of chips in accordance with one or more embodiments.
Figure 5B:
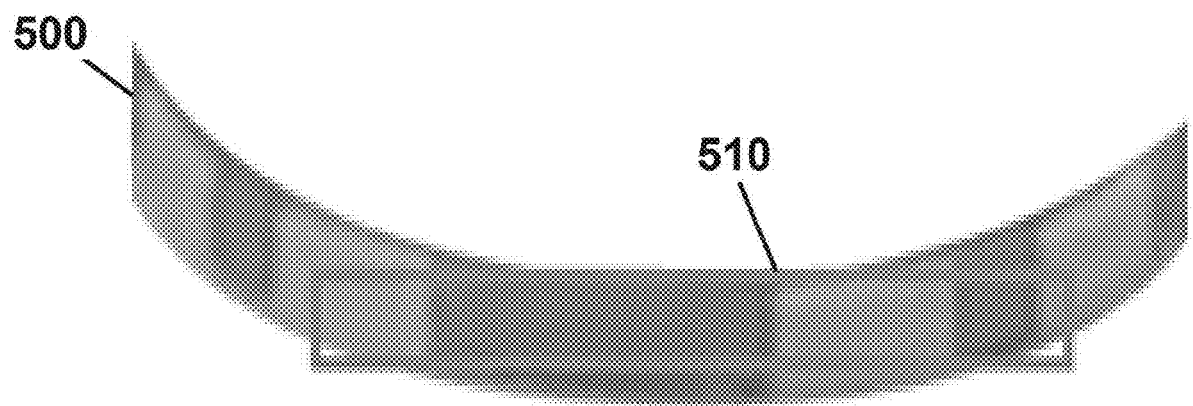
FIG. 5B illustrates a crop window applied to the slice image of FIG. 5A in accordance with one or more embodiments.

In accordance with one or more embodiments, FIG. 5A illustrates a slice image 500 of a typical $500 chip isolated in a stack of chips. A slice may vary in size based upon where the chip stack was placed on the table relative to the camera position. Training images for neural networks are ideally the same size, so each of captured slice may scaled to a standard size. In accordance with one or more alternate embodiments, FIG. 5B illustrates a crop window 510 of the $500 value chip slice 500 of FIG. 5A, wherein the rectangular region within the crop window is the image used for neural network training.

In accordance with one or more embodiments, FIGS. 6A-6C illustrate several modified slice views 610, 620 and 630, respectively, of a $500 value chips (or slices taken from multiple $500 chips) taken at different camera angles. Each slice is stretched to an optimum standardized size, for example, 299×299 pixels, for neural network training. Each modified slice effectively creates a 2D color bar code for that particular chip at a particular rotation angle relative to the camera.

Each of the chips have completely different looks, brightness and coloring based upon the virtual table lighting environment, the virtual felt color, the virtual chips stacked above and below the subject chip, any virtual scene shadows, as well as any changes in virtual camera settings. These are the types of images used for training the neural network to "learn" and classify a chip slice. The key to neural network training is to have enough representative sample images of what each chip slice looks like from the virtual camera's point of view.

In accordance with one or more other embodiments, an alternative method to capturing the chip stack and chip slices in Unity3D without using virtual camera or computer vision software is to programmatically crop the specific portion of a stack/slice from the Unity image since Unity has exact the coordinates of its virtual camera and of the chip(s). Thus the software can randomly place chips/stacks on the playfield, change the lighting and felt color, and crop all chip slices instantly with the appropriate blur, pixilation, shadows, reflections, etc. without using a virtual camera.

Regardless of how the slices are extracted, the slice images are saved to disk with their corresponding ground truth value and other data such as lighting settings/color, felt color, chip table position, timestamp, etc. Many thousands of images of slices and their corresponding data are automatically saved during a game simulation process. This data may be stored in one or more data files, organized, for example, as shown in TABLE 1. The image slice may be stored, for example, in a raster-graphics file-format that supports lossless data compression, such as Portable Network Graphics (PNG). One non-limiting example of a suitable file type for storing data associated with the slice is a JavaScript Object Notation (BON) file, which is an open-standard file format that uses human-readable text to store or transmit data objects consisting of attribute-value pairs and array data types (or any other serializable value) The stored data may then be used to train the neural network for chip classification and/or to stress test and tune the neural network to see how well it handles variations of tables, lights, stack, reflections, etc.

TABLE 1

| Training Image Folder |
|---|
| $1Chip |
|    1Chip_1.png, 1Chip_1.JSON |
|    1Chip_2.png, 1Chip_2.JSON |
|    ... |
|    1Chip_10000.png, 1Chip_10000.png |
| $5Chip |
|    5Chip_1.png, 5Chip_1.JSON |
|    5Chip_2.png, 5Chip_2.JSON |
|    ... |
|    5Chip_10000.png, 5Chip_10000.png |
| .....(other denomination chips) |
| $500Chip |
|    500Chip_1.png, 500Chip_1.JSON |
|    500Chip_2.png, 500Chip_2.JSON |
|    ... |
|    500Chip_10000.png, 500Chip_10000.png |

Figure 7:
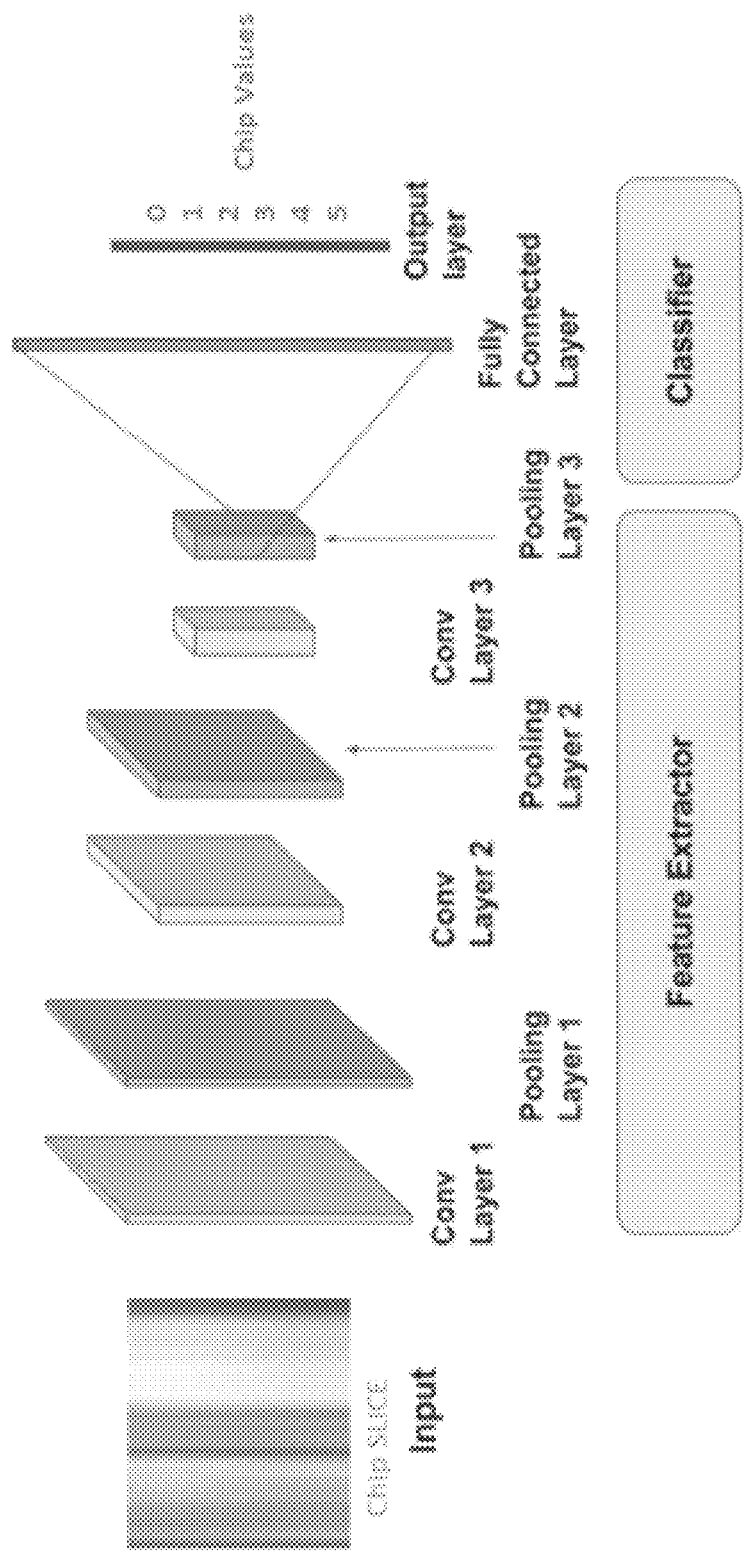
FIG. 7 illustrates one example of a standardized image slice of a virtual casino chip passing through various layers of a neural network in accordance with one or more embodiments.

In neural networks, "classification" can be defined as the grouping of things by shared features, characteristics and qualities. For example, a network might "classify" a number of completely different appearing images of casino chips as "$5 chips" because, even though they are not identical, they have a high degree of similarity. In accordance with one or more embodiments, FIG. 7 illustrates one example of a "slice" of a casino chip fed into a neural network and passed through various feature extraction layers that perform conversions on the input slice until a final classifier layer determines the best classification for the chip ($1, $5, $10, $25, $100, $500, etc). It should be noted that neural network design can take many different approaches and may include many different layers, thus FIG. 7 illustrates but one example. Transfer learning neural networks like VGG and Mobilenet, among others, may be used. In accordance with one or more embodiments, a custom network can be created layer by layer and be specifically designed to identify casino chips by tuning the layers to be especially sensitive to color, relative color ratios in an image and the positions of colors in bands relative to each other are key features that may be extracted in the training validation and run-time classification processes of a neural network dedicated to casino chip classification.

The neural network is first trained by feeding a large number of individual images of chip "slices" from the data files through different evaluation layers. Each layer examines different aspects of the target image, such as color, shape, etc. Coefficients corresponding to each layer may be tuned so that the neural network properly classifies the target image in its final classifier layer. The coefficients may be adjusted by comparing an initial classification with the ground truth classification for the target image. This process is repeated using a large number of images and ground truth values until near perfection is achieved in the network. Examples of this type of network design may be found at https://www.tensorflow.org/tutorials/keras/basic_classification.

Once trained, the neural network is then tested against a different large set of images that it has never seen. This validation set is used to prove the accuracy/confidence scoring of the network. When the network is accurate enough, it may be deployed at one or all tables in a casino.

Figure 8:
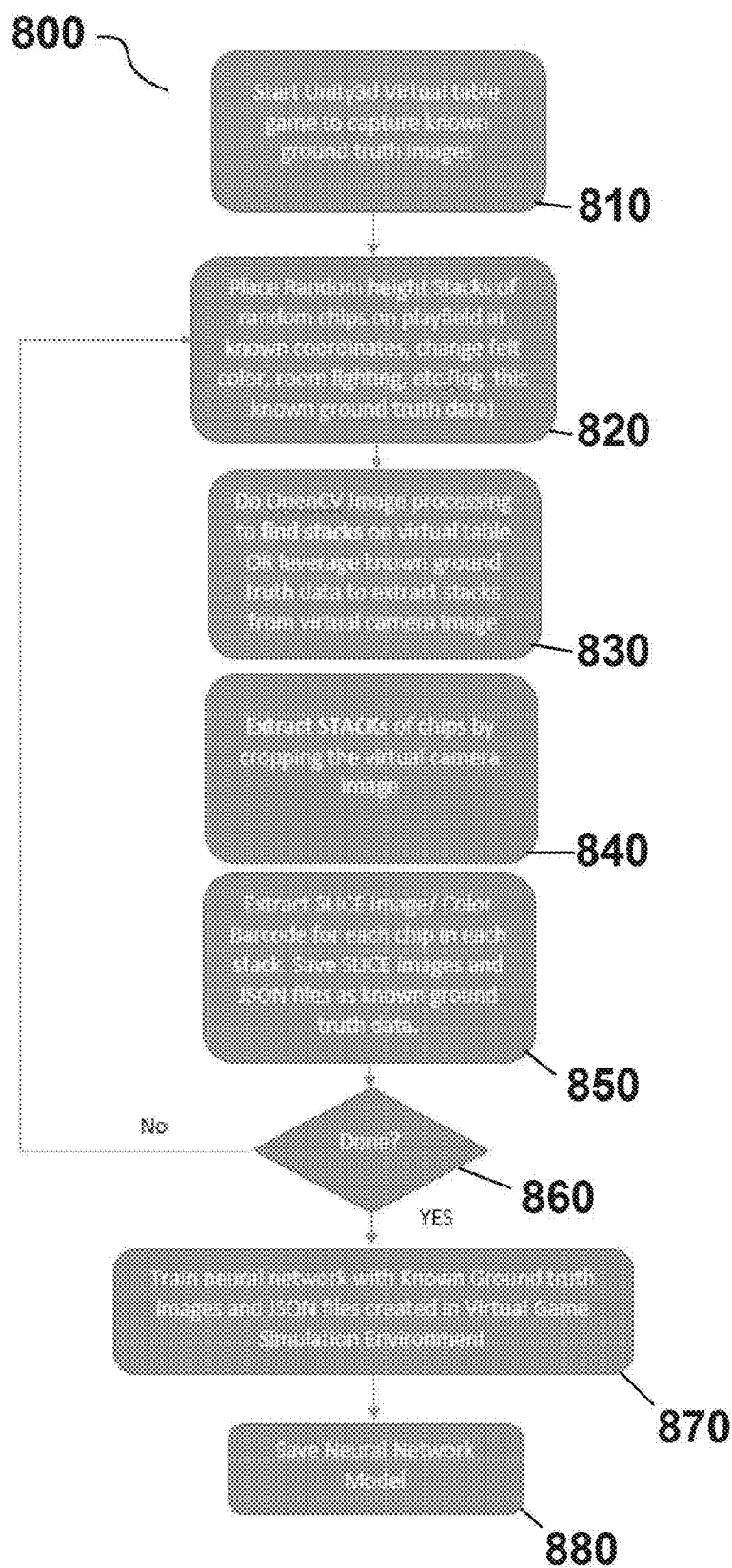
FIG. 8 illustrates the steps of an example of a method 800 for training and creating an initial neural network model in accordance with one or more embodiments.

In accordance with one or more embodiments, and referring to FIG. 8, a example of a method 800 for creating an initial neural network model is presented.

In step 810, a simulated virtual table game is started.

In step 820, random height stacks of random value chips are placed at known coordinates. For example, simulated bets may be placed in betting circles on the virtual table top. Alternately, chips may be "stacked" in the chip rack, as described above, or individual chips may be placed on the table top. Stacks of chips may be placed at each player position, simulating the playing "bank" of each respective player. As described above, alignment and rotation of each chip with respect to its stack and to the virtual camera lens may be randomly determined.

In step 830, perform image processing to identify stacks on the virtual table. Alternately, it may be possible leverage ground truth data to extract stacks from known locations in the virtual camera image, as described below with respect to alternate embodiments illustrated by FIG. 11. In these embodiments, the system may immediately look within each bounding rectangle and extract the slice image(s) in each respective stack or chip of chips, eliminating some of the image processing.

In step 840, the virtual camera image is repeatedly cropped in a manner that isolates each stack detected in the original image. Each cropped area is then saved as a unique stack image for further processing.

In step 850, extract a slice (or an image/color barcode) for each chip in a respective stack image and save the slice images and a file describing the conditions under which it was captured (lighting, etc.).

In step 860, it is determined if enough images have been captured. If not, processing returned to step 820, wherein the table is cleared of chips and a new arrangement of chip stacks is placed.

Otherwise, processing continues at step 870, wherein the neural network is trained using the combined known ground truth data, slice images and corresponding condition data. The neural network is trained with inputs from the Training Image folder and the output is a neural network model. For example the Keras Tensorflow model xCEPTION outputs a model called an H5 model, but all other deep-learning models are contemplated by this disclosure. These models are used both on runtime inference platforms in a real casino table game environment as well as in a simulated virtual training/testing gameplay system, which will be described below with reference to FIG. 9.

Once trained, the neural network model is saved at step 880.

Figure 9:
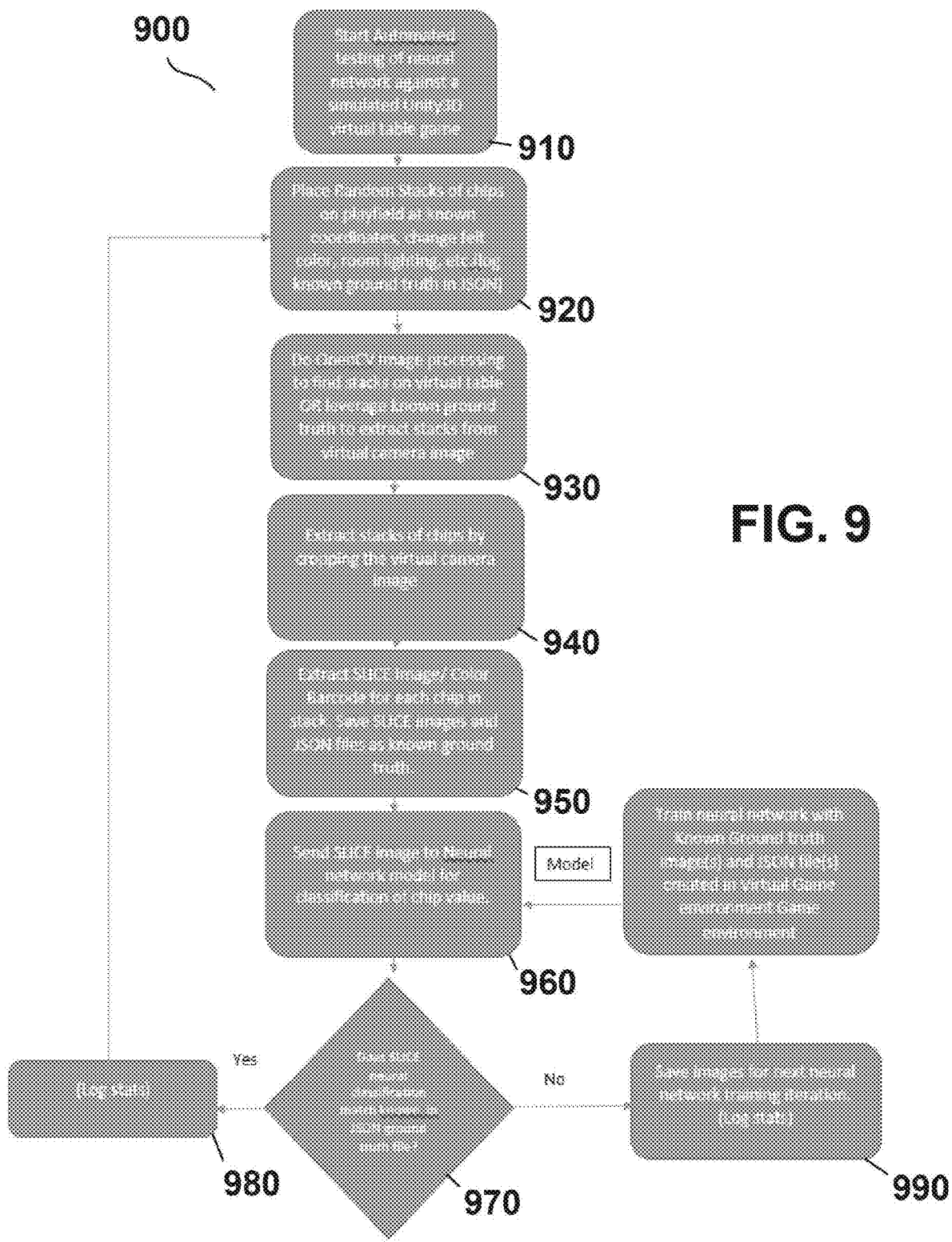
FIG. 9 illustrates the steps of an example of a method 900 for testing a initial neural network model in accordance with one or more embodiments.

In accordance with one or more embodiments, and referring to FIG. 9, an example method 900 of testing and further training a pre-existing neural network is presented.

In step 910, a simulated virtual table game is started. The Unity3D environment loads the neural network and plays virtual table games like blackjack, baccarat, roulette, craps etc., beginning at step 920, wherein random height stacks of random value chips are placed at known coordinates. For example, simulated bets may be placed in betting circles on the virtual table top. Alternately, chips may be "stacked" in the chip rack, as described above, or individual chips may be placed on the table top. Stacks of chips may be placed at each player position, simulating the playing "bank" of each respective player. As described above, alignment and rotation of each chip with respect to its stack and to the virtual camera lens may be randomly determined.

In step 930, perform image processing to identify stacks on the virtual table. Alternately, it may be possible leverage ground truth data to extract stacks from known locations in the virtual camera image, as described below with respect to alternate embodiments illustrated by FIG. 11. In these embodiments, the system may immediately look within each bounding rectangle and extract the slice image(s) in each respective stack or chip of chips, eliminating some of the image processing.

In step 940, the virtual camera image is repeatedly cropped in a manner that isolates each stack detected in the original image. Each cropped area is then saved as a unique stack image for further processing, as described above, at step 950. At step 960, the chip slices captured by the virtual cameras are fed into the originally-trained neural network for classification. The neural network returns what it thinks is the value each chip slice, for example a $25 chip. At step 970, the Unity3D program compares this value to the known ground truth value of the specific chip it took the slice image from. If these values match, that is, the neural network value equals the Unity3D known ground truth value, then the neural network has been properly trained to detect this chip in these table environment settings. At step 980, accuracy statistics are simply updated as simulated play continues at step 920. However, if the neural network value is not equal to the Unity3D generated Known Ground truth value, then the misidentified slice image is saved at step 990 to be used in future neural network training sessions. As described above, the slice image and a file describing the conditions under which it was captured (lighting, etc.) may be stored, again, as shown in TABLE 1. The accuracy statistics are also updated to record the misidentification of a chip and processing continues at step 920.

At the conclusion of simulated play, not shown, the logged statistics data is used to decide if the accuracy of the system is good enough to deploy to a real world casino table. By simulating this game loop many thousands or even millions of times, a well-tuned neural network can be created for use on live tables in a real casino.

The orders of actions shown in FIGS. 8 and 9 and described above are only illustrative, and should not be considered limiting. For example, the order of the actions may be changed, additional steps may be added or some steps may be removed without deviating from the scope and spirit of the invention.

The material particularly shown and described above is not meant to be limiting, but instead serves to show and teach various exemplary implementations of the present subject matter.

For example, in accordance with one or more embodiments, an alternate table game emulation environment may introduces a live camera feed from a real casino gaming table into the Unity3D virtual environment. This augmented reality (AR) game simulation uses a real camera feed from a real table, but superimposes virtual cards, chips, people into the scene to capture ground truth data for training and testing both the image processing and neural network software. Objects detected in the live feed are mapped to a 3D mesh of table objects. In some embodiments, the use of depth sensing cameras at the table help precisely map out the surface and image of the table so that it can be leveraged in an augmented reality Unity3D game simulation world, which then places virtual chips/stacks, cards, avatars and other objects into the simulation scene. Once the game simulation engine has drawn 3D virtual chips on the felt in various locations, the ground truth data is saved for every chip stack, as described above. The camera view image processing, stack capture, and slice extraction are also performed as previously described. The slices of virtual chips superimposed on top of a real video feed of a real felt table surface then are saved. These slices are then processed by the neural network as previously described. In accordance with still other embodiments, a live table game can be in play on the casino floor and, in the background, simulated games can be run on the same table surface to continually improve the accuracy of the neural network and image processing.

Figure 10:
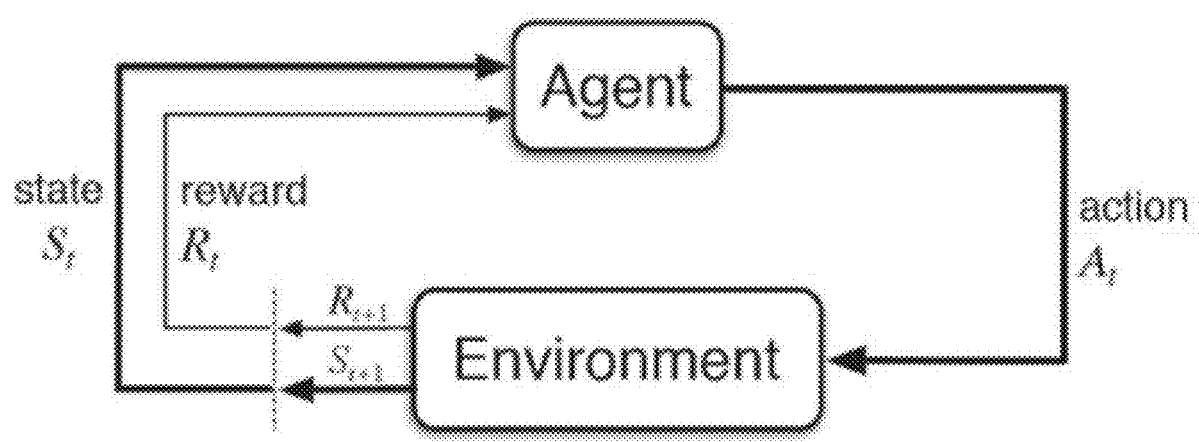
FIG. 10 illustrates an example of a reinforcement feedback loop in accordance with one or more embodiments.

In accordance with one or more other embodiments, the table game simulation environment described above may include observation of a live table game using cameras mounted on or near the table combined with reinforcement learning logic that enables the system to learn in an interactive environment by trial and error, using feedback on its own actions and experiences. Description of reinforcement learning approaches may be found at: https://www.kdnuggets.com/2018/03/5-things-reinforcement-learning.html (see FIG. 10) and at the Unity3D web site: https://blogs.unity3d.com/2017/08/22/unity-ai-reinforcement-learning-with-q-learning/. As in the augmented reality embodiments, live video feeds from the table game are combined with virtual game objects like chips and cards and currency in the simulation. The simulation environment knows the ground truth for the virtual chips and cards it has combined into the live camera video stream, thus it can use this information to give reward points to the system if it properly identifies what is happening on the table. Again, the goal is to eventually have the live camera feed and all real chip and card activity determined automatically by the system as a result of the initial reinforcement learning process.

In accordance with still other reinforcement learning embodiments, the camera(s) observe all player buy-ins at the table and match them to the chips that the dealer gives in return for each buy-in. For example if a player hands the dealer a $100 bill (read by optical character recognition or detected via neural network software) and the dealer returns four green and orange-striped chips to the player, the system can learn that each green and orange-striped chip is worth $25. Through repeated observation and reinforcement learning, the system can eventually identify each chip stack total value at every bet station during live table game play. In accordance with one or more similar embodiments, text-based optical character recognition (OCR) may also be used on the topmost chip of each stack to learn the value of the chip and match it to other chips having the same side color bands. For example, as shown in FIG. 1, a casino chip normally has a denomination (ex. $25) printed on the surface of the center of the chip. Thus, optical character recognition creates the ground truth information later used to reward the system's reinforcement learning software when it correctly guesses the value of other chips having matching slice characteristics.

Figure 11:
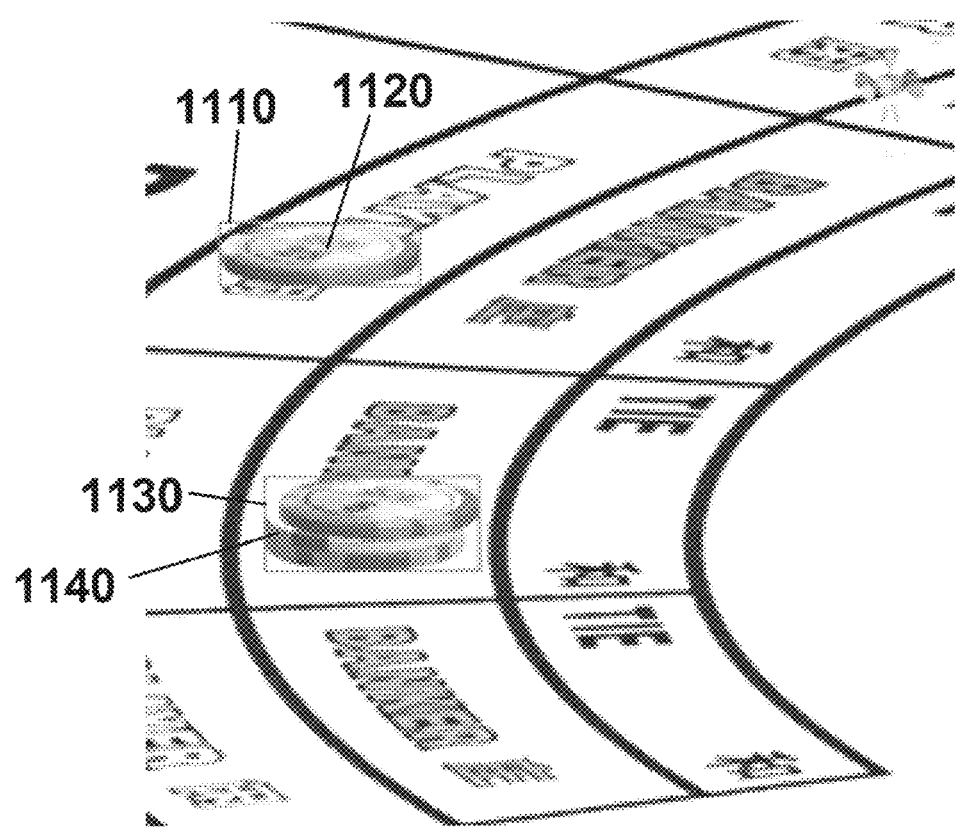
FIG. 11 illustrates an example of the use of bounding rectangles based on ground truth data in accordance with one or more embodiments.

Referring to FIG. 11, in accordance with one or more other embodiments, the Unity3D program may create random stacks of chips on the gaming table surface, as described above. A bounding rectangle 1110 for each chip 1120 may be automatically created by the Unity3D software since it knows exactly where each chip is in its virtual world and its size relative to the distance and aim of the camera. Similarly, a bounding rectangle 1130 for each chip stack 1140 may be automatically created. The system may immediately look within each bounding rectangle and extract the slice image(s) in each respective stack or chip of chips. Processing of this data proceeds as described above. This approach has the advantage that no initial image processing needs to be done, as in the above-described OPENCV computer vision approach, to find the stacks in an image.

An example of a casino table monitoring system, in particular, one possible architecture for such a system which may then be modified according to one or more of the embodiments outlined above, may be found described in co-owned U.S. Pat. No. 7,316,615, entitled "Method and Apparatus for Monitoring Casinos and Gaming," hereby incorporated by reference in its entirety.

The invention claimed is:

1. A method comprising:
receiving, from a casino table game monitoring system, specification data related to a physical object positioned relative to a physical gaming table;
generating, by a processor based on the specification data, synthetic image data based on a virtual scene that depicts a virtual object relative to a virtual gaming table, wherein the virtual object is modeled in the virtual scene using the specification data, and wherein the virtual gaming table is modeled in the virtual scene according to known dimensions of the physical gaming table;
training, by the processor, a machine learning model using the synthetic image data; and
deploying, by the processor via a communications network, the machine learning model to the casino table game monitoring system to monitor the physical object relative to the physical gaming table.

2. The method of claim 1, wherein the specification data includes the known dimensions of the physical gaming table.

3. The method of claim 1, wherein the specification data comprises one or more of images of a casino chip, designs of a casino chip, a texture model of a casino chip, a three-dimensional mesh model representing a casino chip, a color of a casino chip, a casino chip color pattern, a casino branding, a game branding, an image of a bet zone, an electronic design of a table felt, an image of a table felt, and a color of a table felt.

4. The method of claim 1, wherein the specification data comprises image data indicating one or more of table lighting, color reflections, and shadows associated with a gaming environment in a casino in which the physical gaming table is located.

5. The method of claim 1, wherein generating the synthetic image data based on the specification data comprises:
converting, by the processor in response to analysis of the specification data, a felt color of the physical gaming table to a white background color, wherein the felt color is indicated by the specification data; and
automatically changing, by the processor, the white background color in each of a plurality of images captured of the virtual scene for the synthetic image data.

6. The method of claim 1, wherein receiving the specification data comprises receiving a live image feed of the physical gaming table, and wherein generating the synthetic image data comprises:
detecting, by the processor via analysis of the live image feed, the physical object positioned on a game surface of the physical gaming table; and
mapping, by the processor, the detected physical object to a three dimensional mesh modeled from the known dimensions of the physical gaming table.

7. The method of claim 6, wherein the virtual object is positioned at known coordinates on a game surface of the virtual gaming table, wherein the game surface of the virtual gaming table is modeled from the game surface of the physical gaming table depicted in the live image feed.

8. The method of claim 6, further comprising superimposing, by the processor via the mapping, an augmented reality overlay over the live image feed.

9. The method of claim 6, further comprising:
rendering, by the processor according to a view of a virtual camera, the virtual scene;
capturing, by the processor via the virtual camera, image data of the virtual scene;
extracting, by the processor in response to analysis of the image data of the scene, the synthetic image data; and
storing, by the processor, the synthetic image data in a set of ground truth data for the machine learning model.

10. The method of claim 9, wherein the training comprises training, by the processor, the machine learning model using the synthetic image data from the set of ground truth data.

11. The method of claim 9, wherein the virtual camera is positioned in the virtual scene to mimic a view of a real camera, positioned relative to the surface of the physical gaming table, to capture the live image feed.

12. The method of claim 11, wherein the real camera is a depth sensing camera, wherein the specification data includes depth sensing data of the physical gaming table included with the live image feed, and wherein generating, based on the specification data, the synthetic image data of the virtual scene comprises modeling, by the processor based on the depth sensing data, the virtual gaming table in the virtual scene.

13. The method of claim 12, wherein the virtual camera has a depth of field feature and wherein generating the synthetic image data comprises blurring, using the depth of field feature, an appearance of the virtual scene based on a distance, determined from the depth sensing data, of the real camera to one or more of the physical object or the physical gaming table.

14. A system comprising:
a network communications interface configured to communicate via a communications network; and
a processor configured to execute instructions, which when executed cause the system to perform operations to
receive, from a casino table game monitoring system, specification data related to a physical object positioned relative to a physical gaming table,
generate, based on the specification data, synthetic image data based on a virtual scene that depicts a virtual object relative to a virtual gaming table, wherein the virtual object is modeled in the virtual scene using the specification data, and wherein the virtual gaming table is modeled in the virtual scene according to known dimensions of the physical gaming table,
train a machine learning model using the synthetic image data, and
deploy, via the communications network, the machine learning model to the casino table game monitoring system to monitor the physical object relative to the physical gaming table.

15. One or more non-transitory, computer-readable storage media having instructions stored thereon, which, when executed by a set of one or more processors, cause the set of one or more processors to perform operations comprising:
receiving, from a casino table game monitoring system, specification data related to a physical object positioned relative to a physical gaming table;
generating, by a processor based on the specification data, synthetic image data based on a virtual scene that depicts a virtual object relative to a virtual gaming table, wherein the virtual object is modeled in the virtual scene using the specification data, and wherein the virtual gaming table is modeled in the virtual scene according to known dimensions of the physical gaming table;
training, by the processor, a machine learning model using the synthetic image data; and
deploying, by the processor via a communications network, the machine learning model to the casino table game monitoring system to monitor the physical object relative to the physical gaming table.

* * * * *